United States Patent
Ha

(10) Patent No.: US 12,475,490 B2
(45) Date of Patent: Nov. 18, 2025

(54) SERVER AND CONTROL METHOD TO CONTROL CHARGING OF AN ELECTRIC VEHICLE

(71) Applicants: Hyundai Motor Company, Seoul (KR); KIA CORPORATION, Seoul (KR)

(72) Inventor: Seungwoo Ha, Seoul (KR)

( * ) Notice: Subject to any disclaimer, the term of this patent is extended or adjusted under 35 U.S.C. 154(b) by 0 days.

(21) Appl. No.: 18/231,481

(22) Filed: Aug. 8, 2023

(65) Prior Publication Data

US 2024/0086980 A1 Mar. 14, 2024

(30) Foreign Application Priority Data

Sep. 13, 2022 (KR) .................. 10-2022-0114910

(51) Int. Cl.
*G06Q 30/0283* (2023.01)
*B60L 53/62* (2019.01)
(Continued)

(52) U.S. Cl.
CPC .......... *G06Q 30/0284* (2013.01); *B60L 53/62* (2019.02); *B60L 53/68* (2019.02); *B60L 55/00* (2019.02); *G06Q 50/06* (2013.01)

(58) Field of Classification Search
CPC ..... G06Q 30/0284; B60L 53/68; B60L 55/00; B60L 53/62; B60L 50/06
See application file for complete search history.

(56) References Cited

U.S. PATENT DOCUMENTS

2005/0052290 A1* 3/2005 Naden .................. G06Q 10/087
340/993
2009/0177595 A1* 7/2009 Dunlap .................. B60L 53/31
320/109
(Continued)

FOREIGN PATENT DOCUMENTS

JP 2012-226625 A 11/2012
JP 2015-41300 A 3/2015
(Continued)

OTHER PUBLICATIONS

H. Kim, H. Myeong, I. Park, J. H. Choi and K. Kim, "Vehicle-to-Grid Charging Optimization of Electric Vehicle," 2020 IEEE Conference on Control Technology and Applications (CCTA), Montreal, QC, Canada, 2020, pp. 1-6, doi: 10.1109/CCTA41146.2020.9206325. (Year: 2020).*

*Primary Examiner* — Emmett K. Walsh
*Assistant Examiner* — Danielle Elizabeth Zevitz
(74) *Attorney, Agent, or Firm* — Banner & Witcoff, Ltd.

(57) ABSTRACT

A server may include a transceiver configured to communicate with a charger, and a controller configured to determine, based on state information of a vehicle, a required state of charge (SoC), control, based on charging and discharging from an SoC of the vehicle to the required SoC and electricity charging costs over periods, the charger to increase (e.g., maximize) an expected profit, and while controlling the charger, adjust the electricity charging costs over the periods so that a first electricity charging cost at a start time of a first period of the periods is lower than a constant electricity charging cost over the first period, and the first electricity charging cost is gradually (e.g., linearly) increased over the first period.

20 Claims, 9 Drawing Sheets a middle time point(Tm)

(51) Int. Cl.
    *B60L 53/68* (2019.01)
    *B60L 55/00* (2019.01)
    *G06Q 50/06* (2024.01)

(56) References Cited

U.S. PATENT DOCUMENTS

| | | | |
|---|---|---|---|
| 2011/0074350 A1* | 3/2011 | Kocher | B60L 53/63 |
| | | | 320/109 |
| 2012/0296711 A1* | 11/2012 | Huffman | G06Q 50/06 |
| | | | 705/14.1 |
| 2013/0093393 A1 | 4/2013 | Shimotani et al. | |
| 2019/0092176 A1* | 3/2019 | Uyeki | B60L 53/665 |

FOREIGN PATENT DOCUMENTS

| | | |
|---|---|---|
| JP | 2015-141465 A | 8/2015 |
| JP | 2020-71781 A | 5/2020 |
| KR | 101814209 B1 | 1/2018 |

* cited by examiner

FIG.3
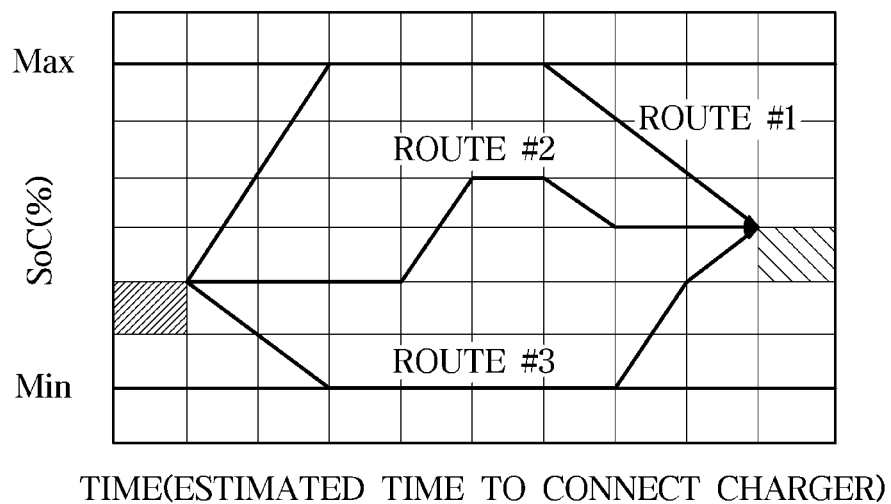
TIME(ESTIMATED TIME TO CONNECT CHARGER)
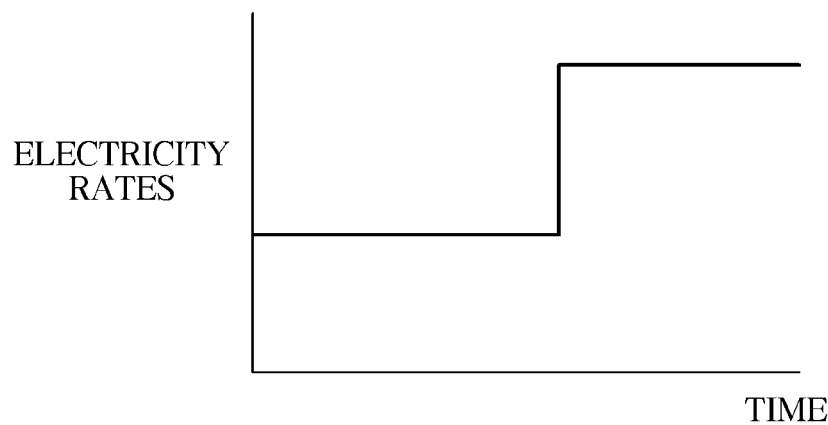
TIME

FIG.6
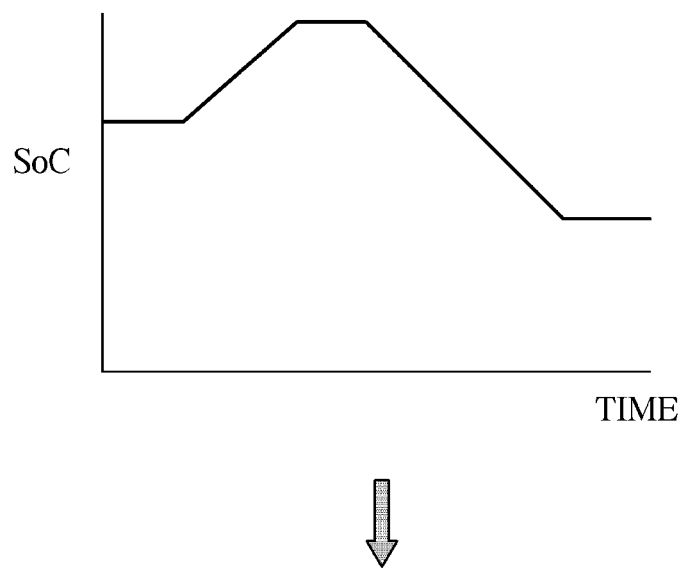
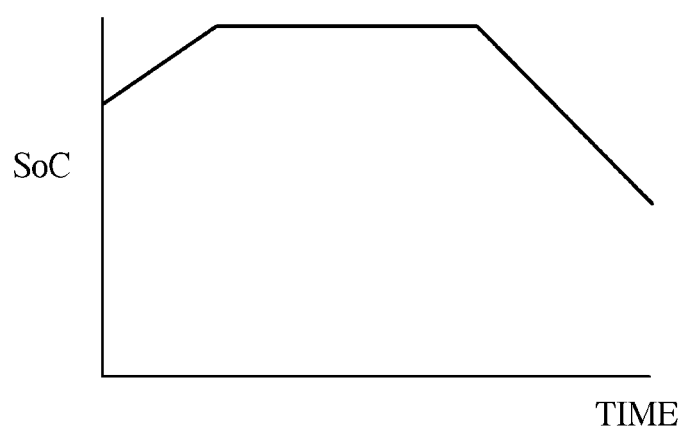

SERVER AND CONTROL METHOD TO CONTROL CHARGING OF AN ELECTRIC VEHICLE

CROSS-REFERENCE TO RELATED APPLICATION

This application claims under 35 U.S.C. § 119 the benefit of Korean Patent Application No. 10-2022-0114910, filed on Sep. 13, 2022 in the Korean Intellectual Property Office, the entire contents of which are incorporated herein by reference.

TECHNICAL FIELD

The disclosure relates to a server for operation of vehicle-to-grid (V2G) and a control method thereof.

BACKGROUND

A vehicle-to-grid (V2G) system refers to a technology that uses an electric vehicle (EV) as an energy storage device by connecting the electric vehicle to a building. That is, in a V2G system, a state of charge (SoC) of a battery of an electric vehicle is maintained as a target SoC, and in order to generate revenue, if the SoC of the electric vehicle battery is higher than the target SoC, the electric vehicle battery may be discharged to charge a battery of a building.

As such, in a V2G system, charging and discharging of an electric vehicle battery may be repeated for revenue generation. Also, an efficient V2G system operation method using various information such as electricity rates, demand response, building's electricity consumption, vehicle usage information, and the like, is required to increase an operating profit of the V2G system.

SUMMARY

An example of the disclosure provides a server and a control method thereof that may determine a desired or required state of charge (SoC) of a vehicle based on state information of the vehicle, control a charger to increase or maximize an expected profit due to charging and discharging based on electricity rate information over time, update the electricity rate information so that charging is performed at an earlier time and discharging is performed at a later time in the constant or same electricity rate time period, and control the SoC to remain the highest in the same time period among several charging routes.

Additional examples of the disclosure will be set forth in part in the description which follows and, in part, will be obvious from the description, or may be learned by practice of the disclosure.

According to the disclosure, there is provided a server that may include a transceiver configured to communicate with a charger; and a controller configured to: determine, based on state information of a vehicle, a required state of charge (SoC); control, based on charging and discharging from an SoC of the vehicle to the required SoC and based on electricity charging costs over periods, the charger to increase an expected profit; and based on controlling the charger, adjust the electricity charging costs over the periods so that a first electricity charging cost at a start time of a first period of the periods is lower than a constant electricity charging cost over the first period, and the first electricity charging cost is increased (e.g., gradually or linearly) over the first period.

The controller may be configured to linearly transform the electricity charging costs over the periods by adjusting the first electricity charging cost at the start time downward and adjusting an electricity charging cost at an end time of the first period upward.

The controller may be configured to adjust the first electricity charging cost at the start time of the first period downward, wherein the first period does not overlap with other periods of the periods.

The controller may be configured to adjust the electricity charging cost at the end time upward of the first period that does not overlap with other periods of the periods.

The controller may be configured to, based on an output of an algorithm (e.g., optimization algorithm) for a discharge priority condition, the required SoC of the vehicle, and cost information about the electricity charging costs over the periods, the controller is further configured to determine the expected profit from charging and discharging using the charger.

The controller may be configured to determine the expected profit as a sum of an income from scheduled discharging and an expenditure from scheduled charging, the income and the expenditure being generated based on scheduled charging and discharging from the SoC of the vehicle to the required SoC.

The controller may be configured to adjust the determined required SoC based on external temperature information of the vehicle and weather information.

The state information of the vehicle may include usage time information and destination information of the vehicle, the usage time information and the destination information being input by a user and received through the communicator (e.g., transceiver).

The controller may be configured to control the communicator (e.g., transceiver) to transmit a message notifying that a charging or discharging schedule is changed, in response to the electricity charging costs over the periods being updated.

The server may further include a storage configured to store the electricity charging costs over the periods, and the controller may be configured to store updated electricity charging costs over periods in the storage.

According to the disclosure, there is provided a control method of a server that may include: determining, based on state information of a vehicle, a required state of charge (SoC); controlling, based on charging and discharging from an SoC of the vehicle to the required SoC and based on electricity charging costs over periods, a charger to increase (e.g., maximize) an expected profit; and based on the controlling the charger, adjusting the electricity charging costs over the periods so that a first electricity charging cost at a start time of a first period of the periods is lower than a constant electricity charging cost over the first period, and the first electricity charging cost is increased (e.g., gradually or linearly) over the first period.

The adjusting of the electricity charging costs over the periods comprises adjusting the first electricity charging cost at the start time downward and adjusting an electricity charging cost at an end time of the first period upward for linearly transforming the electricity charging costs over the periods.

The linearly transforming the electricity charging costs over the periods comprises adjusting the first electricity charging cost at the start time of the first period downward, wherein the first period does not overlap with other periods of the periods.

The linearly transforming the electricity charging costs over the periods comprises adjusting the electricity charging cost at the end time of the first period upward, wherein the first period does not overlap with other periods of the periods.

The controlling the charger may comprise, based on an output of an algorithm for a discharge priority condition, the required SoC of the vehicle, and cost information about the electricity charging costs over the periods, determining the expected profit from charging and discharging using the charger.

The controlling the charger may comprise determining the expected profit as a sum of an income from scheduled discharging and an expenditure from scheduled charging, the income and the expenditure being generated based on scheduled charging and discharging from the SoC of the vehicle to the required SoC.

The control method of the server may further include adjusting the determined required SoC based on external temperature information of the vehicle and weather information.

The state information of the vehicle may include usage time information and destination information of the vehicle, the usage time information and the destination information being input by a user and received through a transceiver.

The control method of the server may further include controlling a transceiver to transmit a message notifying that a charging or discharging schedule is changed, in response to the electricity charging costs over the periods being updated.

The control method of the server may further include storing updated electricity charging costs over periods in a storage.

BRIEF DESCRIPTION OF THE DRAWINGS

These and/or other examples of the disclosure will become apparent and more readily appreciated from the following description of examples, taken in conjunction with the accompanying drawings of which:

FIG. 3 shows an example of control of a V2G system by a server;

FIG. 6 shows an example of a change in state of charge (SoC) through updating of electricity rate information by a server;

DETAILED DESCRIPTION

Figure 1:
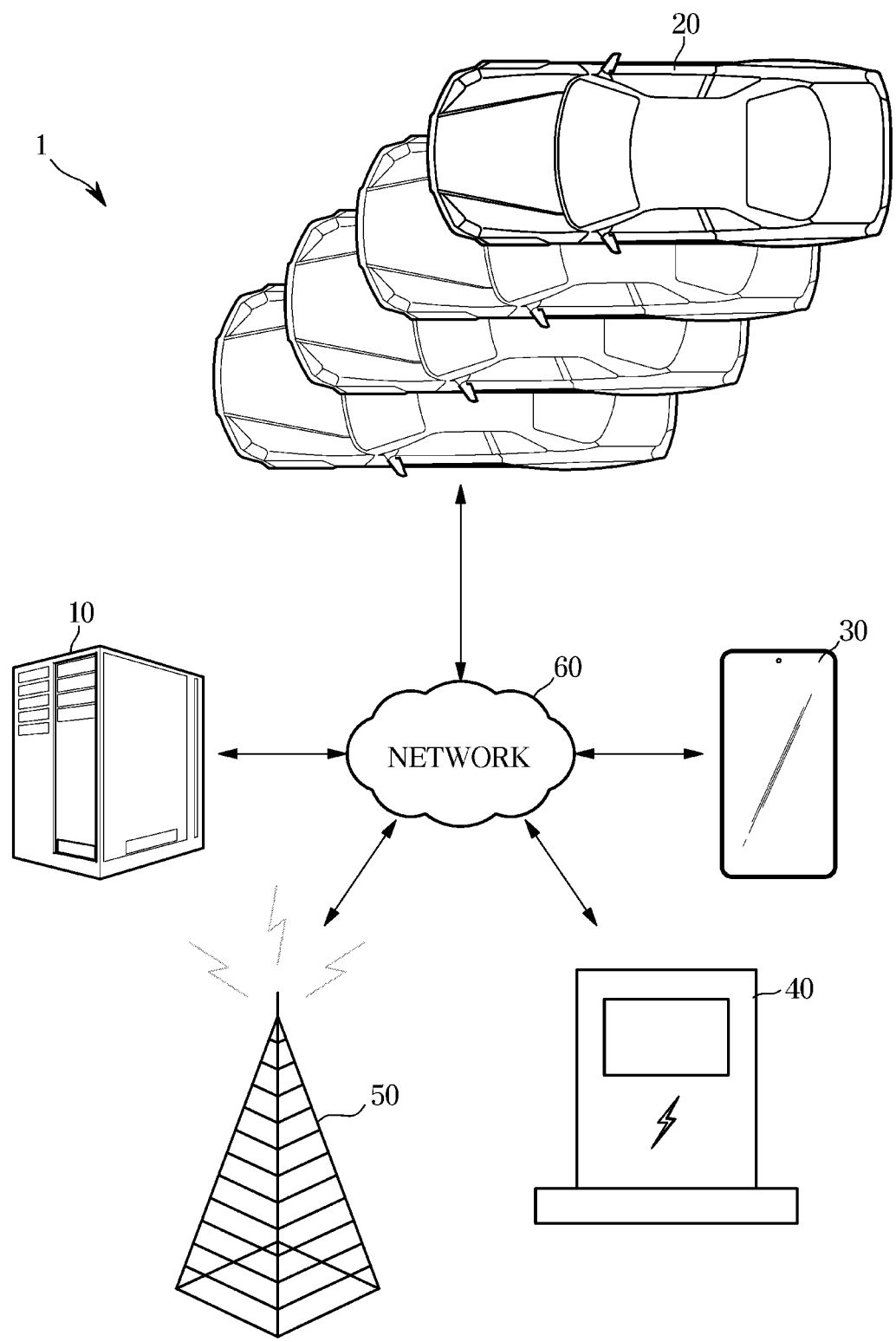
FIG. 1 shows an example of a vehicle-to-grid (V2G) system.

Like reference numerals throughout the specification denote like elements. Also, this specification does not describe all the elements according to examples of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be further understood that the terms "include" when used in this specification, specifies the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terms such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, examples of a server and a control method thereof will be described in detail with reference to the accompanying drawings.

FIG. 1 shows an example of a vehicle-to-grid (V2G) system.

Referring to FIG. 1, a V2G system 1 according to an example may include a server 10 operating the V2G system 1, a plurality of vehicles 20 participated in the V2G system 1, and a power grid 50 supplying power to at least one charger 40 that may charge or discharge a battery of a user terminal 30 of a driver of the vehicle 20.

The V2G system 1 refers to a technology that uses the vehicle 20 as an energy storage device by connecting the electric vehicle to a building or other devices. If power charged in the electric vehicle is sufficient, the V2G system 1 may discharge the power of the electric vehicle, allowing the power to be used as power of the building or other devices to generate revenue.

To this end, the V2G system 1 includes the plurality of vehicles 20 and the plurality of chargers 40 capable of charging the vehicle 20 or delivering power discharged from the vehicle 20 to the building or other devices.

For example, in order for the V2G system 1 to be operated, the server 10 may receive information about the vehicle 20 (vehicle information) including location information, reservation information, and state of charge (SoC) information from the vehicle 20 included in the V2G system 1, and may schedule charging/discharging of each of the plurality of vehicles 20 based on the vehicle information.

For example, the server 10 may correspond to a management server of a fleet business company such as a rental car company or a car sharing platform, and may schedule charging/discharging so that efficiencies or profits of V2G operation may be increased or maximized based on electricity rate information over time periods and desired or required SoC information.

For example, the vehicle 20 may correspond to an electric vehicle including a motor and a battery supplying power to the motor. For example, however, the vehicle 20 may be a hybrid vehicle further including an engine.

For example, the user terminal 30 may be a terminal of the driver of the vehicle 20. For example, the user terminal 30 may be a terminal of a user using fleet business company's service.

The user may reserve use of the vehicle 20 through the user terminal 30, and the server 10 may receive reservation information of the vehicle 20 from the user terminal 30. However, the reservation information may not be input only through the user terminal 30, and for example, may be directly input by a terminal of a service provider of the server 10.

Also, the user terminal 30 may receive, from the server 10, a notification message about connection or disconnection of the vehicle 20 to the charger 40, and output to the user.

For example, the charger 40 may charge the battery of the vehicle 20 connected to the charger 40 based on a charge/discharge command of the server 10, or discharge power charged in the battery of the vehicle 20 connected to the charger 40, to deliver the power to a building or a device participated in the V2G system 1.

For example, the power grid 50 may refer to a system to supply power from an energy supplier to various consumers via a power distribution station.

Accordingly, the power grid 50 may supply power to the vehicle 20 and the building or the device from the energy supplier, and transfer a demand response signal from the energy supplier to the server 10.

For example, the power grid 50 may include a smart grid. The smart grid combines information and communication technology with an power grid, thereby enabling bidirectional information exchange between suppliers and consumers, demand response, plus demand response (plus DR), and arbitrage.

Here, the demand response means that an electricity user changes the amount of electricity used to meet a demand of the current amount of electricity, and also refers to a method in which a user adjusts the amount of electricity used if energy suppliers transmit DR signals to consumers.

Also, the plus DR refers to, if electricity has been produced more than predicted, a demand management service may be applied for decreasing or minimizing output control by increasing power consumption by a consumer. In V2G, remaining energy may be used for EV charging.

The arbitrage may refer to a method of generating profits by repeating charging/discharging using a difference in electricity rates by time periods.

In this instance, the server 10, the vehicle 20, the charger 40, the user terminal 30, and the power grid 50 may transmit and receive data to and from each other through a network 60.

The V2G system 1 has been briefly described above. Hereinafter, the server 10 of the V2G system 1 is described in detail.

Figure 2:
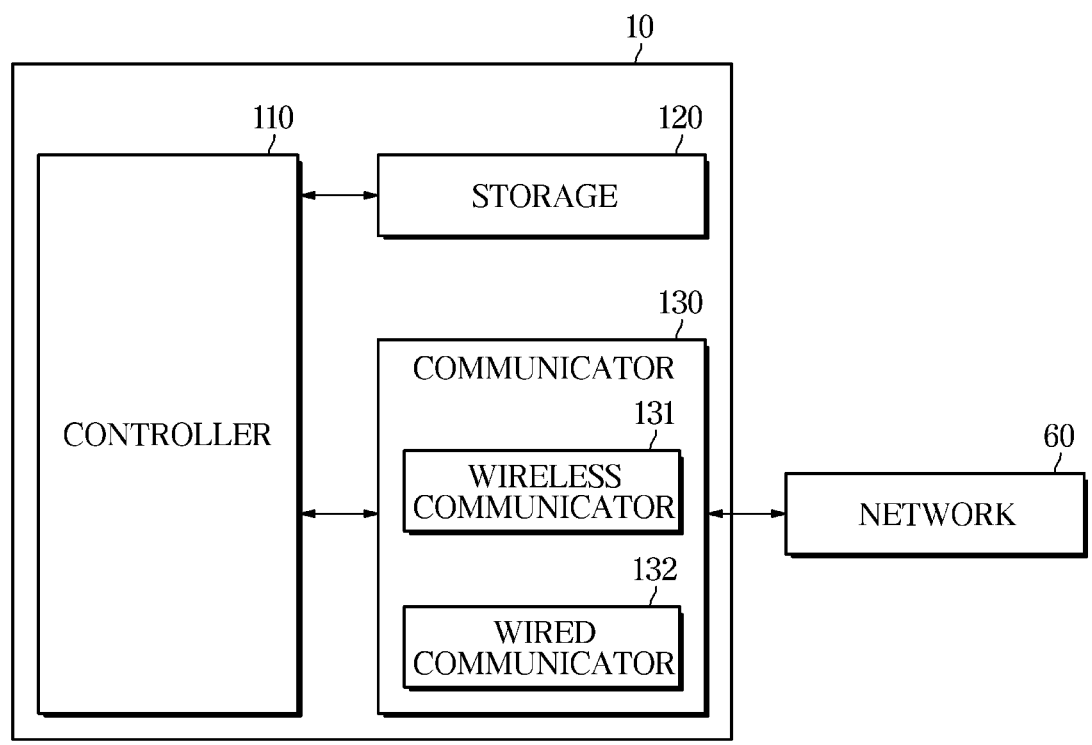
FIG. 2 shows an example of a control block diagram of a server.

FIG. 2 shows an example of a server.

Referring to FIG. 2, the server 10 according to an example includes a communicator 130 (e.g., a transceiver) communicating with an external device through the network 60, a controller 110 operating the V2G system 1, and a storage 120 storing various information desired or required for control.

According to an example, the communicator 130 (e.g., a transceiver) may transmit and receive data to and from the vehicle 20, the charger 40, the user terminal 30 and the power grid 50 through the network 60. To this end, the communicator 130 may be provided as at least one of a type of wired communication module or wireless communication module.

The communicator 130 may include at least one constituent component enabling communication with the external device through the network 60, for example, at least one of a short-range communication module, a wired communicator 132 (e.g., a wired transceiver) or a wireless communicator 131 (e.g., a wireless transceiver).

The wireless communicator 131 may include a wireless communication interface including a receiver and an antenna receiving a specific signal such as a DR signal from the power grid 50. Also, the wireless communicator 131 may further include a signal conversion module for demodulating an analog type of wireless signal received through the wireless communication interface into a digital control signal.

The communicator 130 may receive information about a current location of the vehicle 20 and traffic information from the vehicle 20, and receive destination information and usage time information of the vehicle 20 from the user terminal 30.

The communicator 130 may receive outdoor temperature information (external temperature information of the vehicle 20) and weather information from the vehicle 20 or the user terminal 30, and the server 10 may adjust or correct a desired or required SoC using the received information.

The storage 120 may include a volatile memory such as a static random access memory (S-RAM) and dynamic random access memory (D-RAM), and a non-volatile memory such as a read only memory (ROM), an erasable programmable read only memory (EPROM), and the like.

The storage 120 may store various information for optimal charging/discharging scheduling in the V2G system 2. Specifically, the storage 120 may store state information of the vehicle 20 including the usage time information and the destination information of the vehicle 20.

Also, the storage 120 may store electricity rate information over time in a table form, and store and maintain information updated through updating of the table according to a command of the controller 110.

For example, the controller 110 may determine a desired or required SoC based on the state information of the vehicle 20, and control the charger 40 to increase or maximize an expected profit from charging/discharging, while charging and discharging from an SoC of the vehicle 20 to the desired or required SoC based on the electricity rate information over one or more time periods.

That is, the controller 110 may repeat charging or discharging the vehicle 20 based on the electricity rate information over one or more time periods. The controller 110 may control the charger 40 to increase or maximize the expected profit from charging/discharging by performing charging during one or more time periods if electricity rates are low and performing discharging during one or more time periods if electricity rates are high.

In this instance, the controller 110 may adjust an electricity rate at a start time point downward and adjust an electricity rate at an end time point upward in a constant or same electricity rate time period (e.g., a time period having a same or constant electricity rate).

That is, in order to maintain a high SoC at an earlier time period by prioritizing charging at an earlier time period, the controller 110 may change only the electricity rate table, not set an exception condition by modifying a desirable or optimal charging/discharging algorithm itself, and thus an efficiency of the algorithm may be increased or maximized.

According to an example, the controller 110 of the server 10 may gradually (e.g., linearly) transform the electricity rates by adjusting the electricity rate at the start time point downward, and adjusting the electricity rate at the end time point upward in the constant or same electricity rate time period.

The controller 110 may adjust the electricity rate at the start time point in the constant or same electricity rate time period downward within a range that does not overlap with electricity rates of other time periods, and adjust the electricity rate at the end time point in the constant or same electricity rate time period upward within a range that does not overlap with electricity rates of other time periods.

In changing the electricity rates, however, without gradually or linearly transforming the electricity rates, the controller 110 may adjust the electricity rate at the start time point in the constant or same electricity rate time period downward within a range that does not overlap with electricity rates of other time periods, and adjust the electricity rate at the end time point in the constant or same electricity rate time period upward within a range that does not overlap with electricity rates of other time periods.

The controller 110 may determine the expected profit from charging/discharging in the charger 40, based on an output of an algorithm (e.g., an optimization algorithm) for an electricity rate gradual or linear transformation, the desired or required SoC of the vehicle 20, and the electricity rate information over one or more time periods.

In this instance, the controller 110 may determine the expected profit from charging/discharging as a sum of an income caused by discharging and an expenditure caused by charging. Here, the income and the expenditure may be generated respectively while discharging and charging from the SoC (e.g., a current SoC) of the vehicle 20 to the desired or required SoC.

The controller 110 may adjust or correct the determined required SoC based on the outdoor temperature information and the weather information.

Specifically, the desired or required SoC may refer to a SoC of a battery of the vehicle 20 desired or required for the vehicle 20 to drive to a destination by considering a current location of the vehicle 20 and traffic conditions.

The controller 110 may adjust or correct the desired or required SoC of the vehicle 20, because a driving distance may vary depending on temperatures due to physical characteristics of the battery, and/or operating an air conditioner in a low or high temperature requires additional energy.

Accordingly, the controller 110 may adjust or correct the determined desired or required SoC based on the outdoor temperature information and the weather information that may be received from the vehicle 20 or the user terminal 30.

If the electricity rate information is updated by gradually or linearly transforming the electricity rates, the controller 110 may control the communicator 130 (e.g., a transceiver) to transmit a message notifying that a charging/discharging schedule is changed.

Also, the controller 110 may control the communicator 130 (e.g., a transceiver) to transmit a message notifying that a charging/discharging schedule is changed, if the electricity rate information is updated.

As such, the controller 110 may perform desirable or optimal charging/discharging scheduling by dynamic programming, and may control the communicator 130 to notify a user of a result thereof.

The controller 110 may include at least one memory storing a program performing the aforementioned operations and operations to be described below and at least one processor implementing a stored program. If a plurality of memories and processors are provided, the memories and the processors may be integrated into one chip, or provided in physically separated locations.

Each constituent component of the server 10 has been described in detail above. Hereinafter, described is updating electricity rate information by the server 10 to increase or maximize an operation efficiency or profit of the V2G system 1.

FIG. 3 shows an example of control of a V2G system by a server.

Referring to FIG. 3, the server 10 may select a route for increasing or maximizing an expected profit from among various routes, based on electricity rates by one or more time periods.

The server 10 may determine an expected profit from charging/discharging in the charger 40, based on an output of an algorithm (e.g. optimization algorithm for dynamic programming (DP)) for a discharge priority signal, a desired or required SoC, and electricity rate information over one or more time periods.

In this instance, the algorithm may include any algorithm (e.g., optimization algorithm) using a table that builds a solution based on input values, and include an algorithm for calculating an expected profit from charging/discharging based on an input value such as the electricity rate information over one or more time periods, the desired or required SoC, and the discharge priority signal or charge priority signal.

In this instance, the server 10 may determine the expected profit as a sum of an income caused by discharging and an expenditure caused by charging, based on the electricity rate information over one or more time periods. Here, the income and the expenditure may be generated while charging and discharging from an SoC of the vehicle 20 to the desired or required SoC. Also, the server 10 may determine a charging/discharging schedule to increase or maximize the expected profit.

For example, the server 10 may determine an increased or optimized expected profit, by using an object function that increases or maximizes a sum of electricity rates incurred during charging/discharging as Equation 1 and a constraint condition including the desired or required SoC.

[Equation 1]

For example, as shown in FIG. 3, the server 10 may control charging/discharging according to a route with the increased or highest expected profit corresponding to a sum of an income caused by discharging and an expenditure caused by charging, from among a plurality of routes #1, #2, and #3 to the desired or required SoC from a current SoC.

That is, by charging a battery of the vehicle 20 in a time period where electricity rates are low and discharging the battery of the vehicle 20 in a time period where electricity rates are high, the server 10 may perform charging/discharging according to a route capable of increasing or maximizing an operation profit of the V2G system 1 to reduce or minimize a cost desired or required for charging and increase a profit obtained through discharging.

As such, the server 10 may control the charger 40 to increase or maximize the expected profit based on the state information of the vehicle 20 participated in the V2G system 1 and the electricity rate information over time, thereby increasing or optimizing the operation profit of the V2G system 1.

However, in controlling the charger 40 to increase or maximize the expected profit based on the electricity rate information over one or more time periods, the controller 110 may operate charging to be performed as quickly as possible and discharging to be performed as slowly as possible within a constant or same electricity rate to promote user convenience, which is described below.

Figure 4:
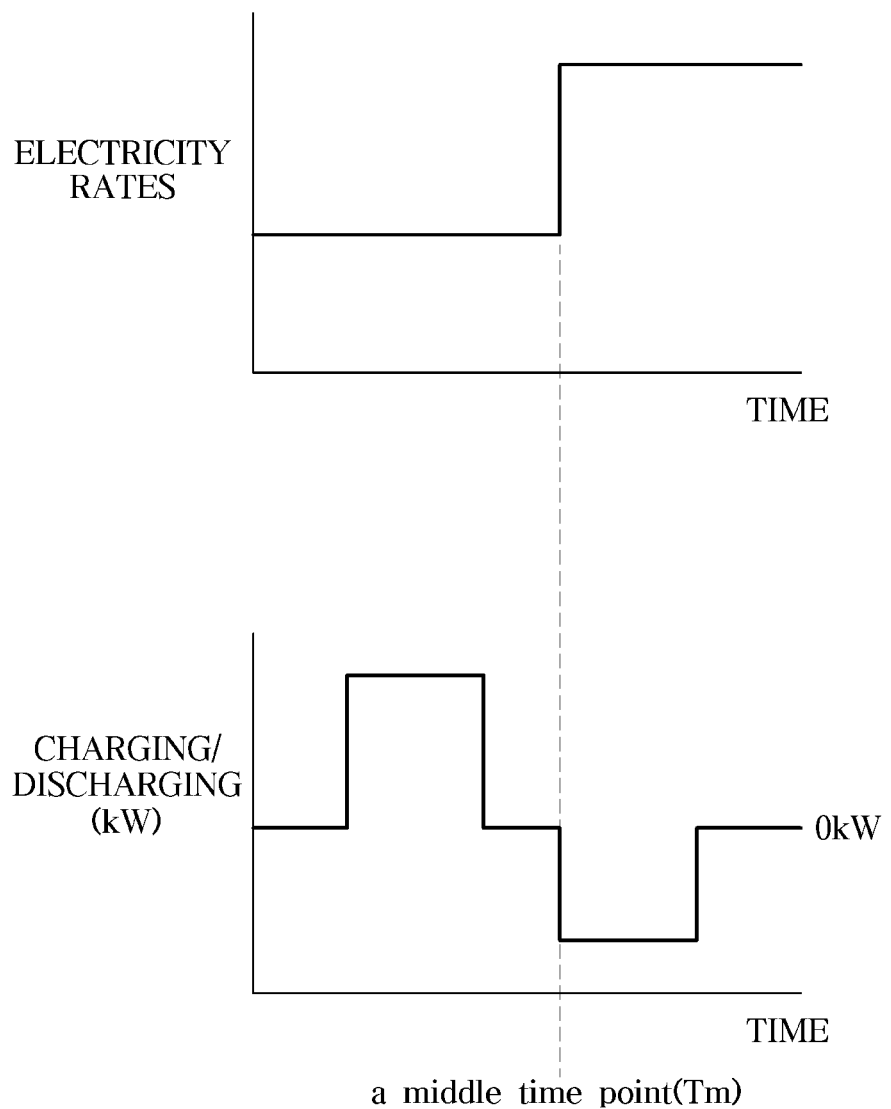
FIG. 4 shows an example of controlling charging and discharging by considering electricity rates over time by a server.

FIG. 4 shows an example of controlling charging and discharging by considering electricity rates over one or more time periods by a server.

Referring to FIG. 4, because the controller 110 may select a charging/discharging schedule to increase or maximize a sum of an income caused by discharging and an expenditure caused by charging, the controller 110 may perform charging from a start time point to a middle time point ($T_m$) where electricity rates are low in FIG. 4.

Also, because electricity rates are high from the middle time point ($T_m$) to an end time point in FIG. 4, the controller 110 may perform discharging, and thus electricity may be purchased during a time period if electricity rates are low, and electricity may be sold in later time period where electricity rates are high.

Accordingly, referring to FIG. 4, the controller 110 may perform charging the vehicle 20 from the start time point to the middle time point ($T_m$), and perform discharging the vehicle 20 from the middle time point ($T_m$) to the end time point.

Thus, a user may use the V2G system 1 with an increased profit (e.g., a maximum profit).

However, because a desirable or optimal solution derived by the controller 110 from the V2G system 1 is selected based on an increased or maximum profit margin, several solutions may exist depending on circumstances.

That is, several optimal solutions that increase or maximize a user's profit may exist depending on an order of charging and discharging. For example, if selling electricity is desired or required, the controller 110 may schedule charging/discharging based on the number of selling electricity during a time period if electricity rates are high, and the order of charging and discharging may not be reflected. Accordingly, an increased or maximum profit may be obtained in both cases of charging relatively early and discharging relatively late, and charging relatively late and discharging relatively early. Here, two desirable or optimal solutions may exist, and according to the present disclosure, the solutions may be arranged so that a charge command is executed first and a discharge command is executed last or the discharge command is executed first and the charge command is executed last.

According to an example, the V2G system 1 may receive an input of reservation information from the user of the vehicle 20, but it may not be guaranteed that the vehicle 20 is used according to the reservation information. Therefore, an SoC may be maintained at an increased or highest level at certain times or all times.

Thus, the controller 110 may arrange solutions so that the charge command is executed first and the discharge command is executed later, even though the number of charging/discharging is equal.

According to an example, the controller 110 may control the SoC to be maintained at the increased or highest level in the constant or same time period among a plurality of charging routes, and thus V2G operation efficiency and user's satisfaction may be improved.

Figure 5:
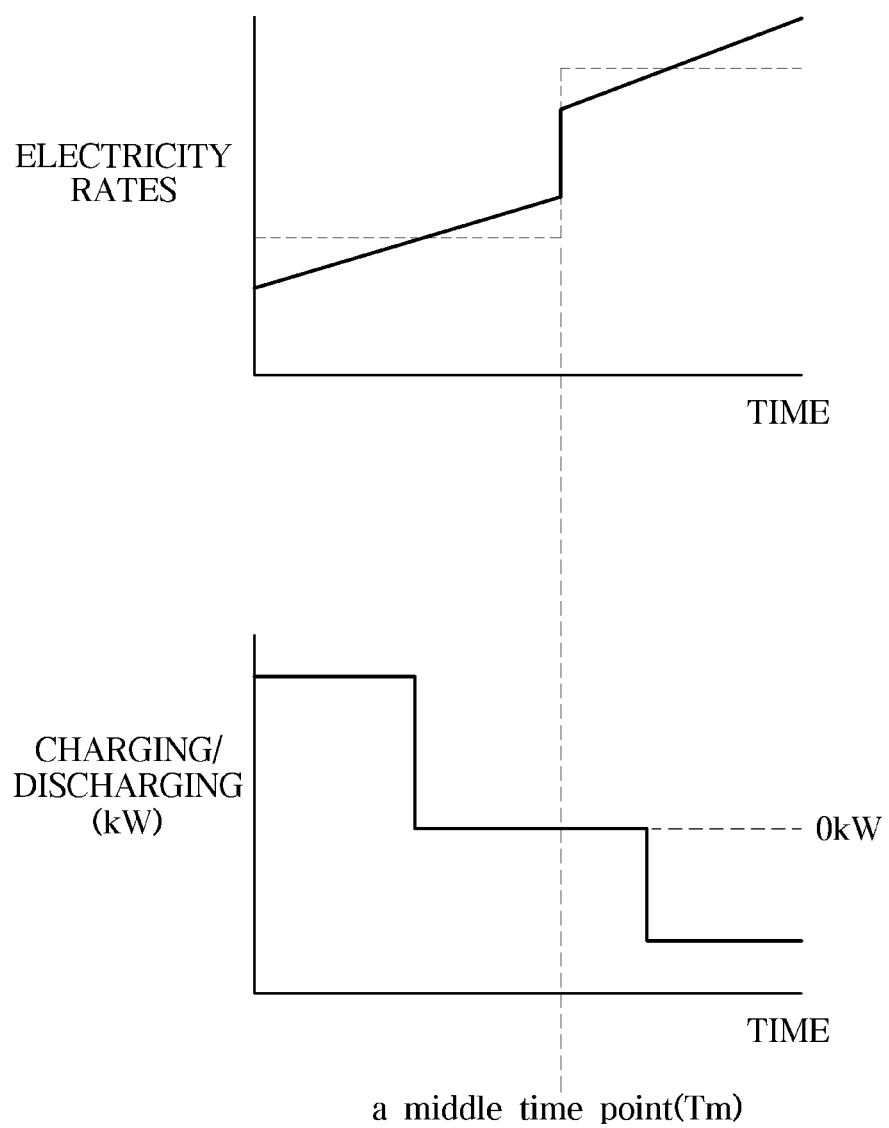
FIG. 5 shows an example of controlling charging and discharging over time by linearly transforming a constant or same electricity rate time period by a server.

FIG. 5 shows an example of controlling charging and discharging over one or more time periods by gradually or linearly transforming a constant or same electricity rate time period by a server.

According to an example, the server 10 may generate a temporary electricity rate table, not build a separate algorithm, to maintain an SoC at an increased or highest level in a constant or same time period among a plurality of charging routes.

That is, the controller 110 may control the SoC to be maintained at the increased or highest level in the constant or same time period among the plurality of charging routes, by temporarily adjusting or correcting the electricity rate table in use, not by setting an exception condition through adding a separate algorithm.

Referring to FIG. 5, the controller 110 may gradually or linearly transform electricity rates by adjusting an electricity rate of a start time point downward and adjusting an electricity rate of an end time point upward in the constant or same electricity rate time period.

In this instance, the linear transformation refers to, by the controller 110, adjusting the electricity rate of the start time point downward and adjusting the electricity rate of the end time point upward in the constant or same electricity rate time period in an electricity rate graph and connecting the adjusted electricity rates in a straight line.

That is, the linear transformation may refer to transforming the electricity rate graph in such a way that the closer the start time point is, the lower the electricity rate is, and the closer the end time point is, the higher the electricity rate is.

The controller 110 may perform the linear transformation with respect to the constant or same electricity rate time period only, and thus a charging time point may be pushed forward and a discharging time point may be delayed without affecting the total number of charging and discharging.

In this instance, the controller 110 may adjust the electricity rate of the start time point in the constant or same electricity rate time period downward within a range that does not overlap with electricity rates of other time periods, and adjust the electricity rate of the end time point in the constant or same electricity rate time period upward within a range that may not overlap with electricity rates of other time periods.

If the electricity rates linearly transformed by the controller 110 become overlapped with electricity rates of other time periods, the total number of charging and discharging may be changed and overall desirable or optimal solutions may also be changed. Accordingly, an appropriate range may be set.

To this end, the controller 110 may adjust the electricity rate of the start time point downward, and adjust the electricity rate of the end time point upward in the constant or same electricity rate time period, within a range that may not overlap with electricity rates of other time periods.

Thus, the server 10 according to an example may only adjust the charging time point and the discharging time point, without affecting an algorithm. That is, as shown in FIG. 5, the controller 110 may perform the linear transformation from the start time point to the middle time point ($T_m$) and from the middle time point ($T_m$) to the end time point to have positive slopes, respectively.

As shown in FIG. 5, a horizontal part of a graph, corresponding to the constant or same electricity rate time period, has a slope, and thus, as shown in FIG. 5, the controller 110 may gradually or linearly transform the electricity rates to be lower than actual electricity rates in an earlier time period and to be higher than the actual electricity rates in a later time period, as evening approaches.

Electricity rates have not been changed in the constant or same time period, but the server 10 according to an example may change electricity rates in the constant or same time period and may reduce a logic by one level, and thus V2G operation efficiency may be improved.

That is, without adding a logic that prioritizes charging in an charging/discharging algorithm in use, the server 10 according to an example may generate a virtual electricity rate table and apply the generated electricity rate table to the charging/discharging algorithm, thereby reducing a logic by one level in the charging/discharging algorithm.

FIG. 6 shows an example of a change in state of charge (SoC) through updating of electricity rate information by a server.

Referring to FIG. 6, the controller 110 may determine an expected profit from charging/discharging in the charger 40 based on an output of an algorithm (e.g., optimization algorithm), and change an SoC.

The controller 110 may select, from a plurality of routes, a route for charging a battery of the vehicle 20 in a time period where electricity rates are low and discharging the battery of the vehicle 20 in a time period where electricity rates are high in order to reduce a cost desired or required for charging and increase a profit obtained through discharging.

In this instance, the controller 110 may arrange a constant or same electricity rate time period in chronological order, and may perform the linear transformation with respect to the arranged constant or same electricity rate time period.

As described above, the controller 110 may performs the linear transformation with respect to the constant or same electricity rate time period to reduce electricity rates as the start time point is closer, and to increase electricity rates as the end time point is closer.

Referring to FIG. 6, through the linear transformation by the controller 110, the SoC may be higher based on a constant or same time point of FIG. 6.

That is, by the server 10 according to an example, even if a user urgently uses the vehicle 20 unlike reservation information input by the user, the SoC of the vehicle 20 may be maintained in a high state.

User satisfaction of the V2G system 1 may be increased, and even if the vehicle 20 receives a demand response (DR) signal requiring to be discharged first, flexible coping may be made.

Figure 7:
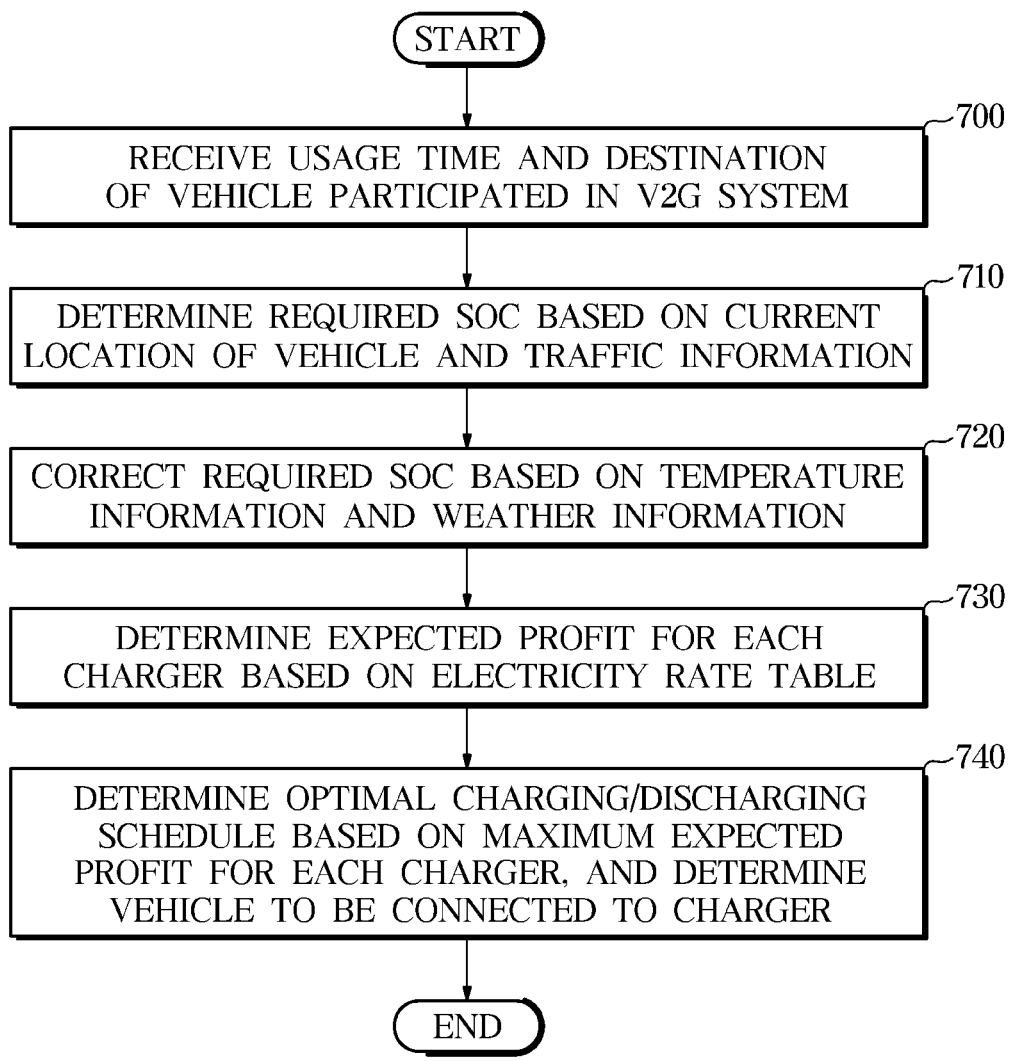
FIG. 7 shows an example of a flowchart showing steps of a control method of a server for determining a charging or discharging schedule.

FIG. 7 shows an example of a flowchart showing steps of a control method of a server for determining a charging or discharging schedule.

FIG. 7 shows an example of a flowchart showing steps of determining and correcting a desired or required SoC, determining an expected profit, and determining a desirable or optimal charging/discharging schedule, in a control method of the server 10.

According to an example, the server 10 at operation 700 may receive a usage time and a destination of the vehicle 20 participated in the V2G system 1.

The usage time and the destination of the vehicle 20 included in state information of the vehicle 20 may be input to the user terminal 30 or the vehicle 20 by a user.

The controller 110 may control the communicator 130 (e.g., a receiver and/or a transceiver) to receive information about the usage time and the destination of the vehicle 20, and use the received information to determine an expected profit for each charger 40.

That is, because the desired or required amount of battery may vary depending on the usage time and a distance to the destination of the vehicle 20, the controller 110 may differently determine a route for a desired or required SoC.

Afterwards, the controller 110 at operation 710 may determine the desired or required SoC based on a current location of the vehicle 20 and traffic information.

That is, the controller 110 may predict a consumed SoC depending on the current location of the vehicle 20 and traffic information, thereby determining the desired or required SoC.

The controller 110 may determine an SoC if charging starts in the charger 40 as a current SoC, and differently determine the desired or required SoC in consideration of the current location of the vehicle 20 and traffic information from the current SoC.

That is, the controller 110 may set the desired or required SoC to be higher if a distance between the current location of the vehicle 20 or a destination is longer than a threshold distance or if the vehicle 20 passes through a congested area, compared to if the distance to the destination is shorter than a threshold distance or if traffic is lighter than a threshold traffic level.

Afterwards, the controller 110 at operation 720 may adjust or correct the desired or required SoC based on temperature information and weather information.

The controller 110 may adjust or correct the desired or required SoC of the vehicle 20, because a driving distance may vary depending on temperatures due to physical characteristics of the battery, and/or operating an air conditioner in a low or high temperature requires additional energy.

After adjusting or correcting the desired or required SoC, the controller 110 at operation 730 may determine an expected profit for each charger 40 based on an electricity rate table.

The V2G system 1 may include a plurality of vehicles 20 and a plurality of chargers 40, and thus the expected profit may be determined for each of the plurality of chargers 40, and the user may select the charger 40 with an increased or maximum expected profit.

The controller 110 at operation 740 may determine an optimal charging/discharging schedule based on an increased or maximum expected profit for each charger 40, and determine the vehicle 20 to be connected to the charger 40.

That is, the controller 110 may select a route having an increased or maximum expected profit as a sum of a cost consumed by charging and a profit obtained through discharging, while charging and discharging from a current SoC to the desired or required SoC.

Accordingly, the user may use the V2G system 1 with an increased or maximum profit, and the V2G system 1 may be efficiently operated without wasting power the most.

Figure 8:
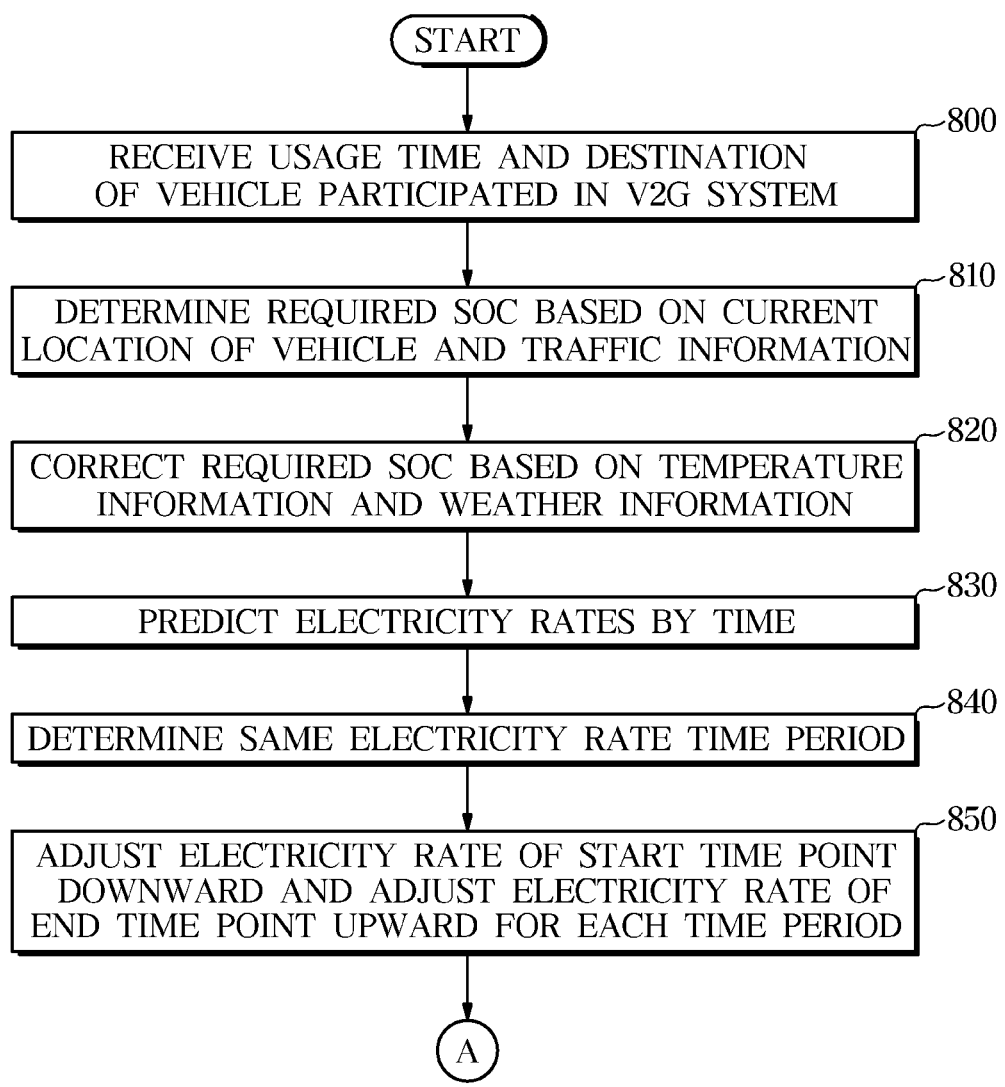
FIG. 8 shows an example of a flowchart showing steps of a control method of a server for adjusting electricity rates.

FIG. 8 shows an example of a flowchart showing steps of a control method of a server for adjusting electricity rates.

Referring to FIG. 8, the controller 110 at operation 800 may control the communicator 130 (e.g., a transceiver, a receiver, and/or a transceiver) to receive a usage time and a destination of the vehicle 20 participated in the V2G system 1.

Afterwards, the controller 110 at operation 820 may determine a desired or required SoC based on location information of the vehicle 20 and traffic information (810), and adjust or correct the desired or required SoC based on temperature information and weather information.

The controller 110 at operation 830 may predict electricity rates by time based on 24 hours.

In this instance, the controller 110 may predict the electricity rates by using big data on electricity rates or artificial intelligence.

The controller 110 at operation 840 may determine a constant or same electricity rate time period (i.e., time periods for each constant or same electricity rate, for the predicted electricity rates), and make classification and arrangement based on electricity rates. That is, the controller 110 may determine a time period of a constant or same electricity rate as a single subject of linear transformation.

The controller 110 may linearly transform each time period of the constant or same electricity rate to control so that charging is performed earlier than discharging while maintaining the constant or same number of charging and discharging.

That is, the controller 110 at operation 850 may adjust an electricity rate of a start time point downward and adjust an electricity rate of an end time point upward for each time period.

Figure 9:
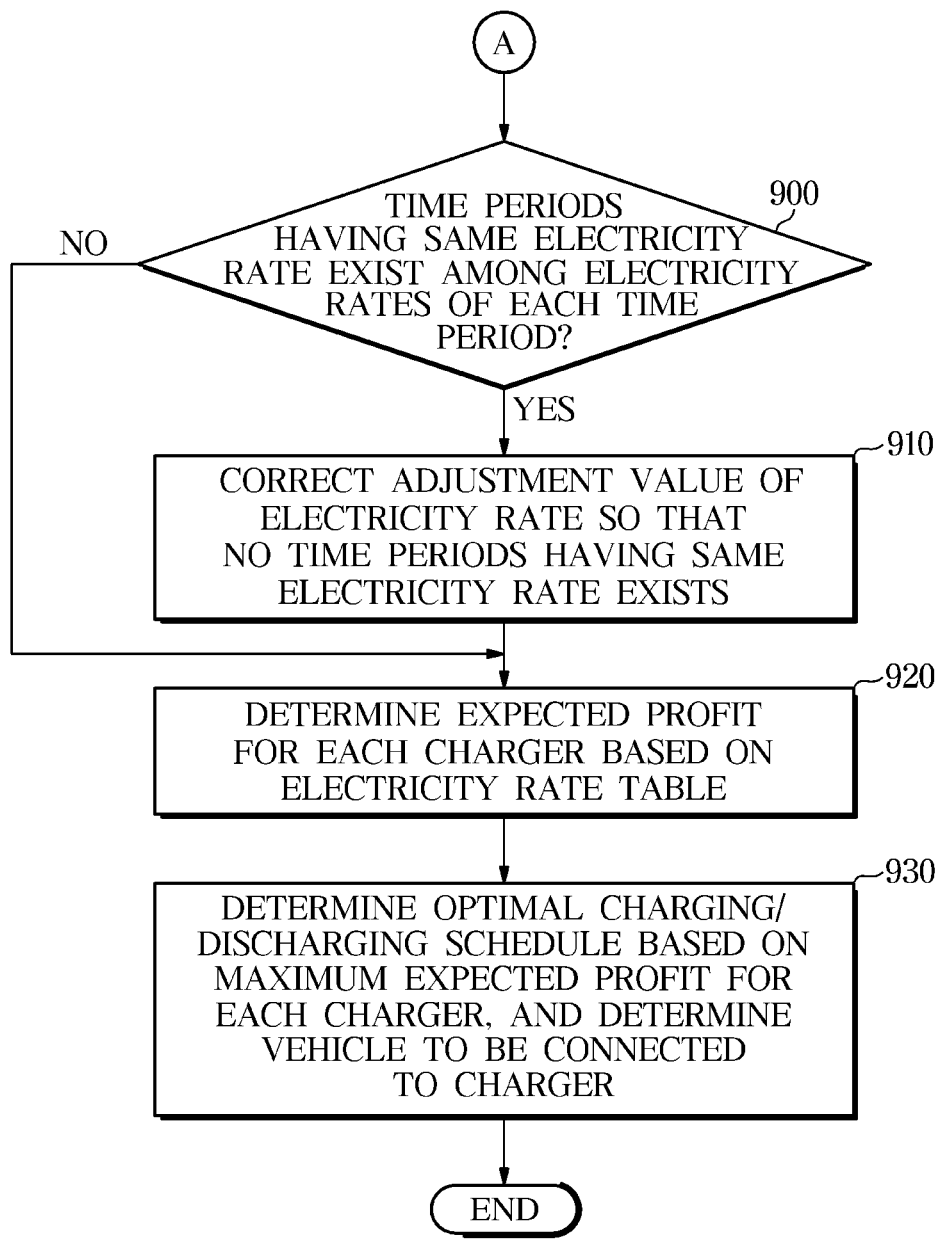
FIG. 9 shows an example of a flowchart showing steps of adjusting electricity rates, in continuation from FIG. 8.

FIG. 9 shows an example of a flowchart showing steps of adjusting electricity rates, in continuation from FIG. 8.

Referring to FIG. 9, the controller 110 at operation 900 may determine whether time periods having a constant or same electricity rate exist among electricity rates of each time period.

For determining whether the time periods having the constant or same electricity rate exist, the controller 110 may determine whether the time periods having the constant or same electricity rate exist in adjacent time periods.

An entire charging/discharging scheduling may be changed, if the controller 110 determines the time periods having the constant or same electricity rate in remote time periods, not adjacent time periods. Accordingly, the controller 110 may consider whether the time periods having the constant or same electricity rate exist, in time periods adjacent to the corresponding constant or same electricity rate time period.

That is, the controller 110 may linearly transform electricity rates, by using an electricity rate of a point in contact with the adjacent time period as a limit value.

Accordingly, if it is determined that the time periods having the constant or same electricity rate exist among electricity rates of each time period (Yes in operation 900), the controller 110 at operation 910 may adjust or correct an adjustment value of electricity rate so that no time periods having the constant or same electricity rate exists.

That is, the controller 110 may adjust or correct the linear transformation so that a result of linear transformation of the electricity rates is not overlapped with electricity rates of adjacent time periods.

If the controller 110 adjusts or corrects the linear transformation so that the result of linear transformation of the electricity rates is not overlapped with electricity rates of adjacent time periods, or if it is not determined that the time periods having the constant or same electricity rate exist among electricity rates of each time period (No in operation 900), the controller 110 at operation 920 may determine an expected profit for each charger 40 based on an electricity rate table.

Afterwards, the controller 110 at operation 930 may determine a desirable or optimal charging/discharging schedule based on an increased or maximum expected profit for each charger 40, and determine the vehicle 20 to be connected to the charger 40.

As such, the controller 110 may control so that charging is performed before discharging in the constant or same electricity rate time period, while maintaining an algorithm of determining the expected profit for each charger 40 based on the electricity rate table, and thus the algorithm may not be required to be changed.

Accordingly, the server 10 according to an example may increase or maximize an efficiency of algorithm used in the V2G system 1.

Meanwhile, in a control method of the server 10 according to an example, omitted is a method of controlling the charger 40 to increase or maximize an expected profit from charging/discharging, updating electricity rate information so that charging is performed earlier than discharging in a constant or same electricity rate time period, and controlling an SoC to be maintained at a highest level in the same time period among several charging routes, because the method has the constant or same technical concept as the above-described examples.

An example of the disclosure provides a server and a control method thereof that may determine a required state of charge (SoC) of a vehicle based on state information of the vehicle, control a charger to maximize an expected profit due to charging and discharging based on electricity rate information over time, update the electricity rate information so that charging is performed at an earlier time and discharging is performed at a later time in the same electricity rate time period, and control the SoC to remain the highest in the same time period among several charging routes.

Additional examples of the disclosure will be set forth in part in the description which follows and, in part, will be obvious from the description, or may be learned by practice of the disclosure.

According to an example of the disclosure, there is provided a server that may include a communicator configured to communicate with a charger; and a controller configured to: determine a required state of charge (SoC) based on state information of a vehicle, control the charger to maximize an expected profit from charging/discharging, while charging and discharging from an SoC of the vehicle to the required SoC, based on electricity rates over time, and while controlling the charger, adjust the electricity rates over time so that an electricity rate of a start time point in a same electricity rate time period is lower than an electricity rate of the same electricity rate time period, and the electricity rate of the same electricity rate time period gradually increases from the start time point.

The controller may be configured to linearly transform the electricity rates by adjusting the electricity rate of the start time point downward and adjusting an electricity rate of an end time point upward in the same electricity rate time period.

The controller may be configured to adjust the electricity rate of the start time point in the same electricity rate time period downward, within a range that does not overlap with electricity rates of other time periods.

The controller may be configured to adjust the electricity rate of the end time point in the same electricity rate time period upward, within a range that does not overlap with electricity rates of other time periods.

The controller may be configured to determine the expected profit from charging/discharging in the charger, based on an output of an optimization algorithm for a discharge priority condition, the required SoC of the vehicle, and information about the electricity rates over time.

The controller may be configured to determine the expected profit from charging/discharging as a sum of an income from discharging and an expenditure from charging, the income and the expenditure being generated while charging and discharging from the SoC of the vehicle to the required SoC.

The controller may be configured to correct the determined required SoC based on external temperature information of the vehicle and weather information.

The state information of the vehicle may include usage time information and destination information of the vehicle, the usage time information and the destination information being input by a user and received through the communicator.

The controller may be configured to control the communicator to transmit a message notifying that a charging/discharging schedule is changed, in response to the electricity rates being updated.

The server may further include a storage configured to store the electricity rates, and the controller may be configured to store updated electricity rates in the storage.

According to an example of the disclosure, there is provided a control method of a server that may include: determining a required SoC based on state information of a vehicle; controlling a charger to maximize an expected profit from charging/discharging, while charging and discharging from an SoC of the vehicle to the required SoC, based on electricity rates over time; and while controlling the charger, adjusting the electricity rates over time so that an electricity rate of a start time point in a same electricity rate time period is lower than an electricity rate of the same electricity rate time period, and the electricity rate of the same electricity rate time period gradually increases.

The adjusting of the electricity rates over time may linearly transform the electricity rates by adjusting the electricity rate of the start time point downward and adjusting an electricity rate of an end time point upward in the same electricity rate time period.

The linearly transforming of the electricity rates may adjust the electricity rate of the start time point in the same electricity rate time period downward, within a range that does not overlap with electricity rates of other time periods.

The linearly transforming of the electricity rates may adjust the electricity rate of the end time point in the same electricity rate time period upward, within a range that does not overlap with electricity rates of other time periods.

The controlling of the charger to maximize the expected profit from charging/discharging may determine the expected profit from charging/discharging in the charger, based on an output of an optimization algorithm for a discharge priority condition, the required SoC of the vehicle, and information about the electricity rates over time.

The controlling of the charger to maximize the expected profit from charging/discharging may determine the expected profit from charging/discharging as a sum of an income from discharging and an expenditure from charging, the income and the expenditure being generated while charging and discharging from the SoC of the vehicle to the required SoC.

The control method of the server may further include correcting the determined required SoC based on external temperature information of the vehicle and weather information.

The state information of the vehicle may include usage time information and destination information of the vehicle, the usage time information and the destination information being input by a user and received through a communicator.

The control method of the server may further include controlling a communicator to transmit a message notifying that a charging/discharging schedule is changed, in response to the electricity rates being updated.

The control method of the server may further include storing updated electricity rates in a storage.

As is apparent from the above, according to the examples of the disclosure, an operation efficiency of V2G system may be improved by reflecting external environment information in an electricity rate table and using an algorithm (e.g., optimization algorithm) without exception, and the V2G operation may be efficiently performed by increasing a reliability of SoC desired or required if using a vehicle.

Examples may be stored in the form of a recording medium storing computer-executable instructions. The instructions may be stored in the form of a program code, and if executed by a processor, the instructions may perform operations of the disclosed examples. The recording medium may be implemented as a non-transitory computer-readable recording medium.

The non-transitory computer-readable recording medium may include all kinds of recording media in which instructions which may be decoded by a computer are stored of, for example, a read only memory (ROM), random access memory (RAM), magnetic tapes, magnetic disks, flash memories, optical recording medium, and the like.

The non-transitory computer-readable recording medium may include all kinds of recording media in which instructions which may be decoded by a computer are stored of, as long as it may store instructions.

Although examples have been described for illustrative purposes, those skilled in the art will appreciate that various modifications, additions and substitutions are possible, without departing from the scope and spirit of the disclosure. Therefore, examples have not been described for limiting purposes.

What is claimed is:

1. A server, comprising:
a transceiver configured to communicate with a charger; and
a processor configured to:
determine, based on state information of a vehicle, a required state of charge (SoC);
control, based on charging and discharging from an SoC of the vehicle to the required SoC and based on electricity charging costs over periods stored in an electricity rate table, the charger to increase an expected profit, wherein based on a 24-hour period, electricity rates are predicted for each time slot and stored in the electricity rate table;
based on controlling the charger, adjust the electricity charging costs over the periods so that a first electricity charging cost at a start time of a first period of the periods is lower than a constant electricity charging cost over the first period, and the first electricity charging cost is increased over the first period;
linearly transform the electricity charging costs over the periods stored in the electricity rate table by adjusting the first electricity charging cost at the start time downward and adjusting an electricity charging cost at an end time of the first period upward, wherein the constant electricity charging cost over the first period is different from a second constant electricity charging cost over a second period of the periods;
set the adjusted electricity charging costs to temporarily override the constant electricity charging cost over the first period and cause, based on the adjusted electricity charging costs, the charger to automatically adjust a sequence of charging and discharging of the vehicle associated with the first period;
adjust the linear transformation so that a result of the linear transformation does not overlap with electricity rates of adjacent time periods, and control the charger to maximize the expected profit based on a transformed electricity rate within a same rate time period, wherein the linear transformation comprises a transformation in which a transformed electricity rate is lower when closer to a start time within the same rate time period, and higher when closer to an end time within the same rate time period; and generate and transmit, via the transceiver, a control signal to the charger to execute the charging or discharging based on the transformed electricity charging costs, such that the transformation results are reflected in real-time charger operation of the charger.

2. The server of claim 1, wherein the processor is further configured to adjust the first electricity charging cost at the start time of the first period downward, wherein the first period does not overlap with other periods of the periods, and to apply the adjusted cost to control the charger in real time.

3. The server of claim 1, wherein the processor is further configured to adjust the electricity charging costs at the end time of the first period upward, wherein the first period does not overlap with other periods of the periods, and to apply the adjusted cost to control the charger in real time.

4. The server of claim 1, wherein, based on an output of an algorithm for a discharge priority condition, the required SoC of the vehicle, and cost information about the electricity charging costs over the periods, the processor is further configured to determine the expected profit from charging and discharging using generated control signals for the charger.

5. The server of claim 1, wherein the processor is further configured to determine the expected profit as a sum of an income from scheduled discharging and an expenditure from scheduled charging, the income and the expenditure being generated based on scheduled charging and discharging from the SoC of the vehicle to the required SoC, and to use the determined expected profit to optimize charger control of the charger.

6. The server of claim 1, wherein the processor is further configured to adjust the determined required SoC based on external temperature information of the vehicle and weather information.

7. The server of claim 1, wherein the state information of the vehicle includes usage time information and destination information of the vehicle, the usage time information and the destination information being input by a user and received through the transceiver.

8. The server of claim 1, wherein the processor is further configured to control the transceiver to transmit a message notifying that at least one of a charging schedule or a discharging schedule is changed, in response to the electricity charging costs over the periods being updated.

9. The server of claim 1, further comprising:
a storage configured to store the electricity charging costs over the periods,
wherein the processor is further configured to store updated electricity charging costs over periods in the storage and apply the stored electricity charging costs in real-time charger control.

10. The server of claim 1, wherein the processor is further configured to:
store, in a virtual electricity rate table to temporarily override the electricity rate table, the linearly transformed electricity charging costs;
cause, based on the linearly transformed electricity charging costs, automatic adjustment of the sequence of charging and discharging of the vehicle associated with the first period; and
based on the automatic adjustment of the sequence:
cause the charger to perform the charging of the vehicle during the first period; and
after the charging of the vehicle during the first period, cause the charger to perform the discharging of the vehicle during the first period.

11. A method of operating a server, comprising:
determining, by a processor of the server, based on state information of a vehicle, a required state of charge (SoC);
controlling, by the processor, based on charging and discharging from an SoC of the vehicle to the required SoC and based on electricity charging costs over periods stored in an electricity rate table, a charger to increase an expected profit, wherein based on a 24-hour period, electricity rates are predicted for each time slot and stored in the electricity rate table; and
based on the controlling, by the processor, the charger, adjusting the electricity charging costs over the periods so that a first electricity charging cost at a start time of a first period of the periods is lower than a constant electricity charging cost over the first period, and the first electricity charging cost is increased over the first period, wherein the adjusting of the electricity charging costs over the periods stored in the electricity rate table comprises adjusting the first electricity charging cost at the start time downward and adjusting an electricity charging cost at an end time of the first period upward for linearly transforming the electricity charging costs over the periods stored in the electricity rate table, and wherein the constant electricity charging cost over the first period is different from a second constant electricity charging cost over a second period of the periods;
adjusting, by the processor, the linear transformation so that a result of a linear transformation of the electricity rates does not overlap with electricity rates of adjacent time periods;
controlling, by the processor, the charger so that the expected profit is maximized based on the linearly transformed electricity rate within a same rate time period;
setting, by the processor, the adjusted electricity charging costs to temporarily override the constant electricity charging cost over the first period to cause the charger to automatically adjust a sequence of charging and discharging of the vehicle associated with the first period;
causing, by the processor and based on the adjusted electricity charging costs, the charger to automatically adjust the sequence of charging and discharging of the vehicle associated with the first period, wherein the linear transformation of the electricity rates comprises a transformation in which, based on a transformed electricity rate being closer to a start time within the same rate time period, the transformed electricity rate is lower and, based on the transformed electricity rate being closer to an end time within the same rate time period, the transformed electricity rate is higher; and
transmitting, by the processor and via a transceiver, a control signal to the charger to implement the charging or discharging sequence based on the transformed electricity charging costs, such that the transformation results are reflected in real-time charger operation of the charger.

12. The method of claim 11, wherein the linearly transforming the electricity charging costs over the periods comprises adjusting the first electricity charging cost at the start time of the first period downward, wherein the first period does not overlap with other periods of the periods, and applying the adjusted cost to control the charger.

13. The method of claim 11, wherein the linearly transforming the electricity charging costs over the periods comprises adjusting the electricity charging cost at the end time of the first period upward, wherein the first period does not overlap with other periods of the periods, and applying the adjusted cost to control the charger in real time.

14. The method of claim 11, wherein the controlling the charger comprises, based on an output of an algorithm for a discharge priority condition, the required SoC of the vehicle, and cost information about the electricity charging costs over the periods, determining the expected profit from charging and discharging using the charger and generating control signals for the charger based on the determined expected profit.

15. The method of claim 11, wherein the controlling the charger comprises determining the expected profit as a sum of an income from scheduled discharging and an expenditure from scheduled charging, the income and the expenditure being generated based on scheduled charging and discharging from the SoC of the vehicle to the required SoC, and using the determined expected profit to optimize a charger control of the charger.

16. The method of claim 11, further comprising:
adjusting the determined required SoC based on external temperature information of the vehicle and weather information.

17. The method of claim 11, wherein the state information of the vehicle includes usage time information and destination information of the vehicle, the usage time information and the destination information being input by a user and received through a transceiver.

18. The method of claim 11, further comprising:
controlling a transceiver to transmit a message notifying that at least one of a charging schedule or a discharging schedule is changed, in response to the electricity charging costs over the periods being updated.

19. The method of claim 11, further comprising:
storing updated electricity charging costs over periods in a storage and applying the stored costs in real-time charger control of the charger.

20. The method of claim 11, further comprising:
storing, in a virtual electricity rate table to temporarily override the electricity rate table, the linearly transformed electricity charging costs;
causing, by the processor and based on the linearly transformed electricity charging costs, automatic adjustment of the sequence of charging and discharging of the vehicle associated with the first period; and
based on the automatic adjustment of the sequence:
causing, by the processor, the charger to perform the charging of the vehicle during the first period; and
after the charging of the vehicle during the first period, causing, by the processor, the charger to perform the discharging of the vehicle during the first period.

* * * * *